United States Patent [19]

Uchida

[11] Patent Number: 4,704,523
[45] Date of Patent: Nov. 3, 1987

[54] OPTICAL ROTARY ENCODER DEVICE
[75] Inventor: Hiroyuki Uchida, Hino, Japan
[73] Assignee: Fanuc Ltd., Yamanashi, Japan
[21] Appl. No.: 817,938
[22] PCT Filed: Apr. 15, 1985
[86] PCT No.: PCT/JP85/00200
§ 371 Date: Dec. 9, 1985
§ 102(e) Date: Dec. 9, 1985
[87] PCT Pub. No.: WO85/04710
PCT Pub. Date: Oct. 24, 1985

[30] Foreign Application Priority Data
Apr. 14, 1984 [JP] Japan .................................. 59-73868
[51] Int. Cl.$^4$ .............................................. G01D 5/34
[52] U.S. Cl. .......................... 250/231 SE; 250/237 G; 340/347 P
[58] Field of Search .................... 340/347 P; 356/395; 250/237 G, 231 E, 239

[56] References Cited
U.S. PATENT DOCUMENTS 3,999,064 12/1976 Kramer ..................... 340/347 P
4,096,383  6/1978 Mancini et al. ............. 250/227
4,184,071  1/1980 Fryer et al. ................. 250/237 G
4,345,149  8/1982 Blaser ........................ 250/231 SE
4,375,592  3/1983 Cox et al. ................... 250/231 SE
4,512,184  4/1985 Ernst et al. .................. 250/231 SE
4,580,047  4/1986 Sasaki et al. ................ 250/231 SE
4,644,158  2/1987 Taillebois .................... 250/239

Primary Examiner—Edward P. Westin
Assistant Examiner—Jessica L. Ruoff
Attorney, Agent, or Firm—Armstrong, Nikaido, Marmelstein & Kubovcik

[57] ABSTRACT

An encoder device having a rotating plate (6) provided with a plurality of light transmission areas (61) and light shielding areas (62), a first optical fiber cable (7, 8) for guiding light from a light emitting element (33a, 33b) at one side of the rotation plate so as to illuminate the light transmission and shielding areas, and second and third optical fiber cables (9, 10), provided at the other side of the rotating plate, for receiving light transmitted through the light transmission area of the rotating plate via a predetermined slit (4a), the second and third optical fiber cables being provided so as to obtain light reception signals having a predetermined phase difference therebetween. The encoder device can have a signal processing circuit which generates a rotational position of the rotating plate (6) in an absolute mode when incorporating an incremental type mechanism section.

6 Claims, 10 Drawing Figures

OPTICAL ROTARY ENCODER DEVICE

TECHNICAL FIELD

The present invention relates to an encoder device and, more particularly, to an optical rotary encoder device wherein an incremental type encoder device is constituted by optical fibers, an output from the encoder device is generated in an absolute mode, and the encoder device generates a rotation and a rotating direction of a rotating shaft in the absolute mode.

BACKGROUND ART

Optical rotary encoders are widely used for precisely detecting a position of a moving industrial machine such as a numerically controlled apparatus (NC). The encoder is often installed in poor environmental locations, e.g., areas of extreme temperatures and considerable dust, etc. In addition, the encoder is often separated by several tens of meters from a control apparatus of the NC using a position detection signal from the encoder as a control signal. In a conventional encoder, light emitted from a light emitting diode is received by a light receiving element such as a photodiode through a slit formed in a rotating plate, and a signal from the light receiving element is generated as a rotational position signal through signal processing. For this reason, the encoder installed at the detecting site incorporates a light emitting diode, a photodiode, and a signal processing circuit. In the conventional encoder of this type, the signal processing circuit generally comprises a semiconductor element, and when the ambient temperature of the encoder becomes high, the signal processing circuit may not operate normally.

Since an output from the signal processing circuit is a low level signal of, e.g., about 5 VDC, when the encoder is separated from the control apparatus by a long distance, the output from the signal processing circuit may be influenced by electrical noise from a power cable. In order to overcome this drawback, twisted pair shield cables are used, and the encoder is located separately from the power cables. However, this results in increased cost and inconvenience.

Encoders are divided into incremental and absolute types. In the former encoder, light shielding portions and light transmission portions (slits) are provided along a periphery of a rotating plate which is fixed to a rotating shaft for detecting a movement of an industrial machine, as described above. A light emitting diode emits light from one side of the rotating plate, and a photodiode is provided at the other side of the rotating plate so as to receive the light emitted from the light emitting diode. When the rotating plate is rotated in a normal direction, the encoder generates an incremental signal, and otherwise, generates a decremental signal. In the latter encoder, a plurality of light transmission channel arrays each having a predetermined pattern along a radial direction of a rotating plate are provided along the periphery of the rotating plate, and light emitting diodes are provided at one side of the rotating plate, so that light emitted from the light emitting diodes is received by a photodiode array corresponding to the light transmission channels. Thus, a position of the rotating shaft is uniquely generated by a combination of the light reception signals of the photodiodes, i.e., in an absolute mode.

In the incremental type encoder, since the rotating plate has a simple structure, the signal processing circuit can be simplified. However, since the encoder is powered by the control apparatus, a position signal from the rotation plate is lost upon cutting-off or failure of a control power source. Therefore, when power is turned on again, unless a count is restarted from a standard position, a position of the rotating plate cannot be detected. On the other hand, the absolute type encoder has an advantage that a position of the rotating plate can be quickly detected by a light receiving pattern of the photodiode array even when the power is turned on again after power is cut off. However, since the rotating plate has a complex structure and many light receiving elements are provided, the signal processing circuit becomes complicated.

In either encoder, a light emitting diode is used as a light emitting element, and a photodiode is used as a light receiving element. However, due to strong directivity, the light emitting diode must be three-dimensionally adjusted upon observation by a synchronous scope or the like in order to obtain good light receiving characteristics at the photodiode, thereby complicating assembly and adjustment. Similarly, adjustment and inspection such as microscopic inspection are needed for detecting whether or not the rotating plate is eccentric about its central axis and for aligning a phase of the stationary slit.

· Furthermore, in either type of conventional encoder, a rotational position of the rotating plate is detected only during one revolution, and a rotation of the rotating plate itself is not held as an output from the encoder For this reason, a calculation for obtaining an overall moving distance of the industrial machine must be performed at the control apparatus side of the NC, and a desired position signal cannot be obtained simply by the output signal from the encoder. Therefore, problems occur from the viewpoint of total signal processing.

Also, the conventional encoder has a relatively large power consumption.

DISCLOSURE OF THE INVENTION

It is a first object of the present invention to provide an encoder device having abundant high resistance to various environmental factors, e.g., temperature or electrical noise.

It is a second object of the present invention to provide an encoder device which can be easily assembled and adjusted.

It is a third object of the present invention to provide an encoder device which has a simple structure and can generate a position, a rotation, and a rotating direction of a rotating plate by a simple circuit in an absolute mode.

It is another object of the present invention to provide an encoder with a small power consumption.

It is still another object of the present invention to provide an encoder device which allows easy maintenance.

In order to achieve the above objects, the present invention is based upon the following technical concepts.

First, an encoder mechanism section comprises a simple structure of an incremental type, as described above, and an output in virtually an absolute mode is obtained based on circuit technique.

Second, unlike conventional light emitting and receiving elements such as a light emitting diode and a photodiode, these elements are provided so as not to directly oppose each other at two sides of a rotating plate, and optical fiber cables are oppositely mounted so as to sandwich the rotating plate of the encoder mechanism section therebetween so that emission and reception of light is made through the optical fiber cables to allow easy assembly. The light emitting and receiving elements and the signal processing circuit are provided by utilizing the optical fiber cables in, e.g., a control apparatus separated from a position at which the encoder mechanism section is placed.

Furthermore, the rotation and the rotating direction of the rotating plate are obtained in accordance with the circuit technique, and power consumption is lowered. Again, from an overall viewpoint of an encoder system, a system configuration which allows high economy, easy maintenance, and high reliability is achieved.

Thus, according to the basic mode of the present invention, there is provided an encoder device including: a rotating plate which is fixed to a rotating shaft and in which a plurality of light transmission and shielding areas are continuously formed at predetermined intervals along a circumferential surface thereof; first optical fiber means for guiding light emitted from a light receiving element provided at one side of the rotating plate so as to illuminate the light transmission and shielding areas; and second and third optical fiber means, provided at the other side of the rotating plate, for receiving light transmitted through the light transmission areas via a predetermined slit, the third optical fiber means being arranged so as to detect a rotational position of the rotating plate to have a predetermined phase difference with respect to the second optical fiber means.

BEST MODE OF CARRYING OUT THE INVENTION

A preferred embodiment of the present invention will be described with reference to the accompanying drawings.

Figure 1:
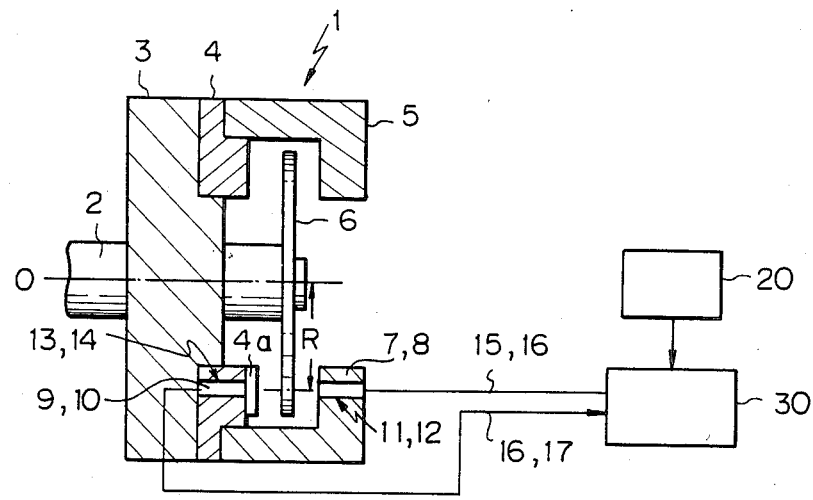
FIG. 1 is a sectional view schematically showing an encoder device according to an embodiment of the present invention.

FIG. 1 is a sectional view schematically showing an encoder device according to an embodiment of the present invention. Referring to FIG. 1, the encoder device is constituted by a mechanism section 1, a signal processing circuit 30 and a power source 20. As shown in a sectional view of FIG. 1, the mechanism section 1 comprises a rotating shaft 2 rotated upon movement of an industrial machine such as an NC whose position is to be detected, a rotating plate 6 fixed to the rotating shaft 2, a flange 3 having a hole through which the rotating shaft 2 passes, an annular stationary slit supporting table 4 concentrically rotatably mounted on the flange, a stationary slit 4a provided on the stationary slit table, and an annular optical fiber fixing table 5 facing the annular concentrically rotatable stationary slit supporting table 4 so as to sandwich the rotating plate 6 therebetween.

Figure 2:
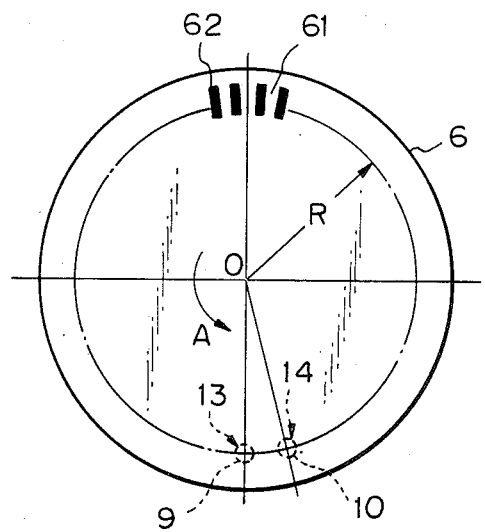
FIG. 2 is a view showing the positional relationship between a rotating plate and an optical fiber cable of the encoder shown in FIG. 1.

FIG. 2 is a front view of the rotating plate 6. In the rotating plate 6, light transmission portions (slits) 61 and light shielding portions 62 are continuously formed along the circumferential surface having the radius R from the central axis O.

Circular through holes 11 are formed in the optical fiber fixing table 5 so as to correspond to the circumference defined by the light transmission and shielding portions 61 and 62, and distal end portions 7 and 8 of optical fiber cables are fitted in the through holes, respectively. Similarly, two circular through holes 13 and 14 are formed in the stationary slit supporting table 4 so as to oppose the circumference defined by the through holes 11 and 12. Distal end portions 9 and 10 of the optical fiber cables are fitted in the circular through holes 13 and 14. Assuming that a pair of the light transmission and shielding portions 61 and 62 are given as 1 pitch or 1 cycle, as shown in FIG. 2, the circular through holes 13 and 14 are arranged in such a manner that light emitted from the side of the through holes 11 and 12 through the light transmission portion 61 via the stationary slit 4a is received by the through hole 14 so as to be delayed from that received by the through hole 13 by a phase of 90° when the rotating plate 6 is rotated in a direction indicated by arrow A shows in FIG. 2 (referred to as a normal rotation hereinafter).

The first optical fiber cable distal end portions 7 and 8 are connected to the signal processing circuit 30 through optical fiber cables 15 and 16. The second and third optical fiber cable distal end portions 9 and 10 are also connected to the signal processing circuit 30 through optical fiber cables 16 and 17. A voltage from the power source 20 is applied to the signal processing circuit 30. FIG. 1 illustrates the cables 15 to 17 to be thinner than the optical fiber cable distal end portions 7 to 10 for the sake of simplicity. However, each of these is a single fiber cable. As the optical fiber cable, a conventional quartz optical fiber cable, for example, is used.

Figure 3:
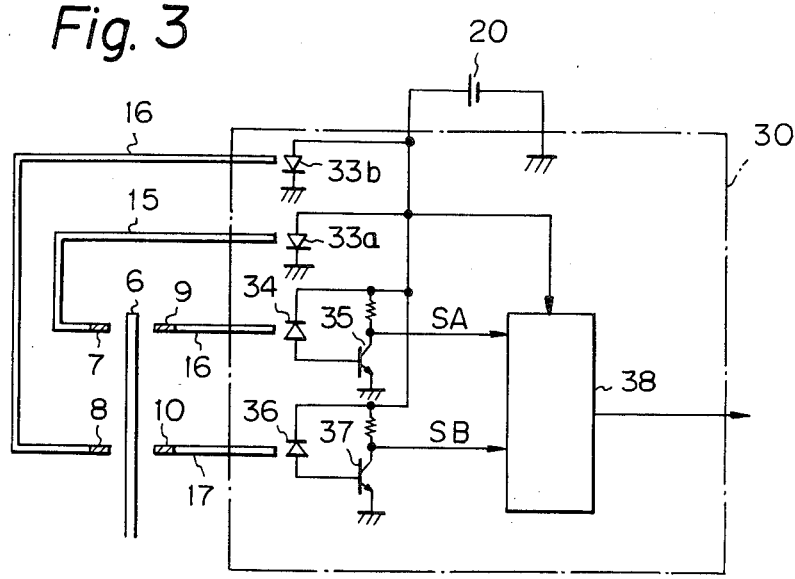
FIG. 3 is a circuit diagram showing a signal processing circuit shown in FIG. 1.

FIG. 3 is a circuit diagram of the signal processing circuit 30 shown in FIG. 1 according to the embodiment of the present invention. This circuit is used for operating the encoder shown in FIG. 1 as an incremental type encoder.

The signal processing circuit 30 includes light emitting diodes 33a and 33b for radiating light on an end of the optical fiber cables 15 and 16 through a focusing lens (not shown), and photodiodes 34 and 36 for photoelectrically converting through a focusing lens (not shown) light which is emitted from the light emitting diodes, transmitted through the optical fiber cables 15 and 16, emerged from the distal end portions 7 and 8 thereof and passed through the light transmission portions of the rotating plate 6, and light which is received by the distal end portions 9 and 10 of the optical fiber cables 16 and 17 and emerged from the other end of the optical fiber cables 16 and 17. Output signals from the photodiodes 34 and 36 are amplified by amplifier circuits 35 and 37 each comprising a resistor and a transistor connected as shown in FIG. 3, and an A-phase signal SA and a B-phase signal SB having a phase difference of 90° from the A-phase signal are supplied to a rotational position calculating circuit 38. The rotational position calculating circuit 38 has the same arrangement as that in a conventional incremental type encoder, and generates at every pitch a change in the rotating plate 6 as an incremental pulse signal in the case of normal rotation, and as a decremental pulse signal in the case of reverse rotation.

An assembly method of the above-mentioned encoder will be described. The components 2, 3, 4, 5 and 6 of the mechanism section 1 shown in FIG. 1 are manufactured in advance. As described above, the through holes 13 and 14 of the stationary slit supporting table 4 and the through holes 11 and 12 of the optical fiber fixing table 5 are provided on the circumference having the radius R from the rotational central axis O. The through holes 11, 12, 13 and 14 are formed along an axis parallel to the rotational central axis O. Diameters of the through holes 11 to 14 are set so as to tightly receive the distal end portions 7 to 10 of the optical fiber cables therein. The thus manufactured components are assembled in the following manner.

The rotating plate is indexed by microscopic observation, and the rotating plate 6 is fixed to the rotating shaft 2. The stationary slit 4a is aligned at a through hole position and is then fixed to the stationary slit supporting table. Next, phase alignment between the light transmission area and the stationary slit 4a is performed, and the stationary slit supporting table 4 is fixed to the flange 3. In this case, an equipment error of the stationary slit supporting table 4 with respect to the flange 3 must be sufficiently small, but must provide a movable range sufficient for phase alignment. These operations are substantially the same as in a conventional encoder device in which a light emitting diode directly faces a light receiving element. Thereafter, the optical fiber fixing table 5 is fitted in the stationary slit supporting table 4, and the optical fiber cables are inserted in the through holes 11 to 14. The optical fiber cable distal end portion 7 is used as a light emitting side and the opposing optical fiber cable distal end portion 9 is used as a light receiving side. The optical fiber fixing table 5 is rotated so that the output signal from, e.g., the amplifier circuit 35 becomes maximum upon observation through a synchroscope. When the output from the amplifier circuit 35 becomes maximum, the optical fiber fixing table 5 is fixed to the stationary slit supporting table 4. An engagement surface between the optical fiber fixing table 5 and the stationary slit supporting table 4 must have a high precision within the range which allows the optical fiber fixing table 15 to be rotatable.

For the purpose of comparison, in a case wherein a light emitting diode and a photodiode directly face each other at two sides of a conventional rotating plate, the last adjustment becomes very complex because the light emitting diode has a strong directivity and position adjustment must be three-dimensionally performed so that its output is maximum. In the above embodiment according to the present invention, since the optical fiber fixing table 5 need only be rotated, i.e., position adjustment in only one direction is required, the adjustment is very easy. Since the through holes 11 to 14 are highly precisely formed by normal machining, the optical fiber cable distal end portions inserted in the through holes do not themselves require adjustment.

Assuming an encoder device in which optical fibers simply oppose each other at two sides of a rotating plate and a stationary slit, it is very difficult to assemble and adjust such an encoder device as well as to effect three-dimensional position adjustment of the conventional light emitting diode and the light receiving element so as to obtain A- and B-phase signals with constant precision. In order to overcome this drawback, members on which the opposing optical fibers are mounted are fixed to an integral structure in a state wherein a rotating plate and a stationary slit are sandwiched thereby. With this arrangement, the alignment precision of the optical fiber pair can be improved. However, in this case, a problem of difficulty in position alignment between the optical fibers and the stationary slit still remains. The alignment precision of the optical fiber pair depends upon machining precision of the above-mentioned integral structure.

Conversely, according to the embodiment of the present invention, easy position alignment can be achieved as described below.

When the stationary slit 4a is fixed to the stationary slit supporting table 4 so as to be aligned with the through holes 13 and 14, positions of the stationary slit 4a and the optical fiber ends 9 and 10 automatically coincide with each other. Since engagement between the flange 3 and the stationary slit supporting table 4 has a sufficient movable range, when the stationary slit 4a is aligned with the light transmission portion of the rotating plate 6 using a microscope as in the conventional adjustment, the rotating plate 6, the stationary slit 4a and the optical fiber ends 9 and 10 are integrally aligned with each other. When the optical fiber fixing table 5 is fitted in an engagement portion of the stationary slit table 4, since the engagement portions of the optical fiber fixing table 5 and the stationary slit table 4 are formed by cylindrical machining, dimensional precision thereof in the radial direction is sufficiently high. Therefore, the rotating plate 6, the stationary slit 4a, and the opposing optical fiber ends 9 and 10 can be precisely aligned with the optical fiber ends 7 and 8 in the radial direction. When the optical fiber fixing table 5 is rotated upon monitoring the outputs from the optical fiber ends 9 and 10 so as to be aligned in the circumferential direction, the optical ends 7 and 8, the rotating plate 6, the stationary slit 4a and the opposing optical fiber ends 9 and 10 are precisely aligned.

In the conventional position adjustment, a flange is considered as a reference, however, since the embodiment of the present invention is made in consideration of the fact that the center of the rotating plate 6 must be aligned with the central axis O of the rotating shaft 2, the optical system is aligned with the rotating plate 6 as a reference. From this viewpoint, the stationary slit 4a is fixed to the stationary slit table 4, and the structure is aligned with the rotating plate 6. Furthermore, the optical fiber fixing table 5 is fitted in the stationary slit table 4. Since portions to have high dimensional precision are manufactured by cylindrical machining, high alignment precision can be obtained by simple machining.

In this manner, assembly of the mechanism section of the encoder according to the present invention can be easier than that of a conventional incremental type encoder and provides a higher precision.

Since the signal processing circuit need not be provided in a housing of the encoder mechanism section, inspection of the signal processing circuit and maintenance such as replacement of parts can be easily performed.

Furthermore, the mechanism section 1 located at a detection position and the signal processing circuit 30 as well as the power source 20 which are connected thereto through the optical fiber cables 15 to 17 can be separated from each other by a considerably long distance without being influenced by electrical noise and without attenuation of electrical signals. As compared to conventional instrumentation, the instrumentation can be simplified and high quality detection data can be obtained. The signal processing circuit 30 can be installed in good environmental conditions, such as in the control apparatus, and can be stably operated. In addition, since the mechanism section 1 does not include a component having poor environmental resistance, the mechanism section 1 can be located in a position of considerably poor environment, and the application field of the encoder device according to the present invention can be widened.

Figure 4:
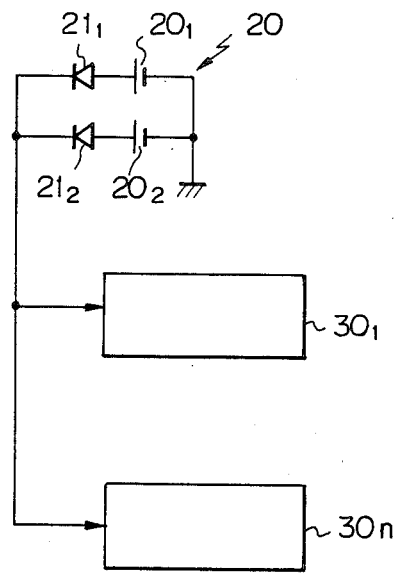
FIG. 4 is a circuit diagram showing a plurality of signal processing circuits.

A case has been described wherein a single encoder device is provided. When a plurality of encoders are used, for example, a plurality of signal processing circuits $30_1$ to $30_n$ are provided in a control apparatus, as shown in FIG. 4, and are connected to a common double-system power source 20 comprising power sources $20_1$ and $20_2$, thereby improving reliability in power sources in an encoder system at low cost. In particular, when one or both of the power sources $20_1$ and $20_2$ uses a battery, even if a control power source is stopped, a power source voltage for the system is continuously generated, and the output from the incremental type encoder can be continuously held, thereby virtually providing the output in the absolute mode.

Figure 5:
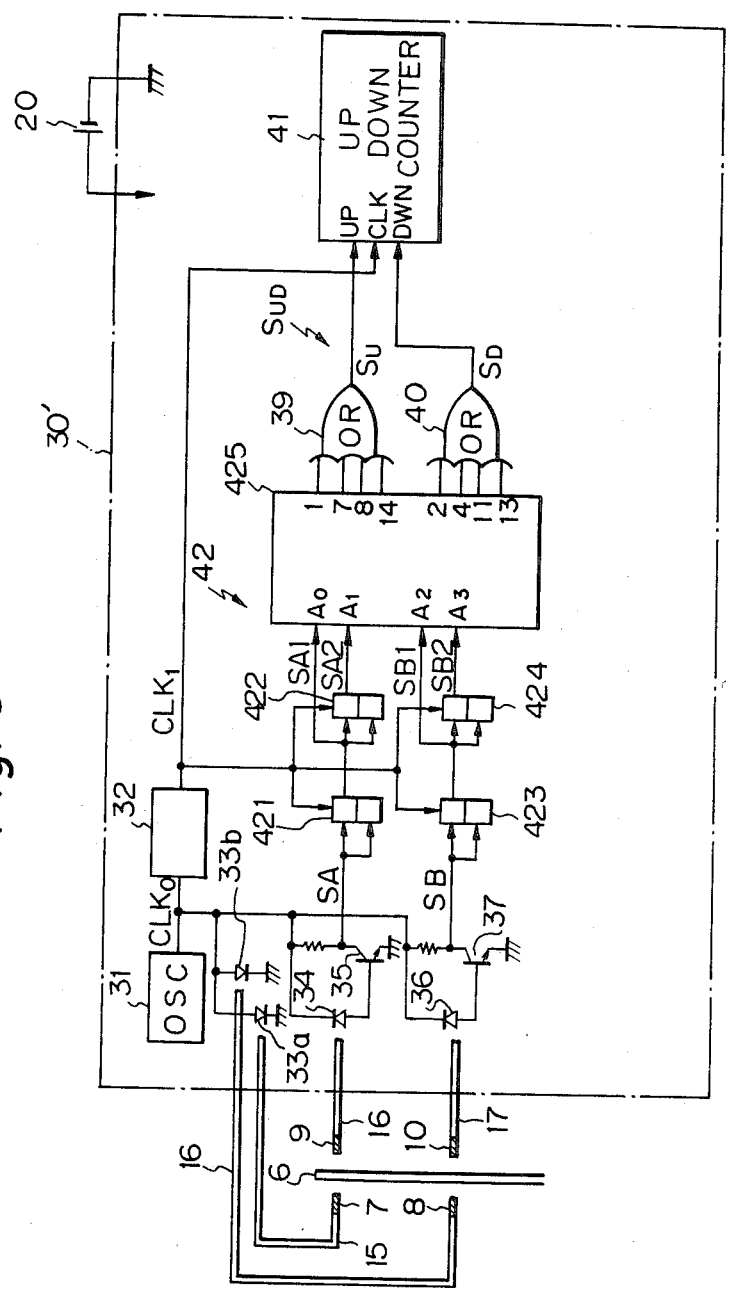
FIG. 5 is a view showing another example of the signal processing circuit shown in FIG. 1.

Another embodiment of the mechanism section 1 of the incremental type encoder shown in FIG. 1 which can detect the rotational speed, the rotating direction, and the rotational position of the rotating plate 6 and in which power consumption is lowered will be described with reference to FIG. 5. FIG. 5 is a circuit diagram of a signal processing circuit 30' and a power source 20. The mechanism section has the same arrangement as in FIG. 1.

Referring to FIG. 5, in the signal processing circuit 30', in addition to an oscillator 31, a monostable multivibrator 32, the same light emitting diodes 33a and 33b, the photodiodes 34 and 36 and the amplifier circuits 35 and 37 as in FIG. 3, a rise/fall detector 42, OR gates 39 and 40, and an up/down counter 41 are connected as shown in FIG. 5. A voltage from the power source 20 is applied to these circuit elements. The rise/fall detector 42 comprises series-connected D flip-flops 421 and 422 for receiving an A-phase signal SA, series-connected D flip-flops 423 and 424 for receiving a B-phase signal SB and a decoder (DECDR) 425 for converting 4 lines into 16 lines upon reception of set output signals SA1, SA2, SB1 and SB2 from the flip-flops 421 to 424, respectively. Outputs from the decoder 425 are supplied to the OR gates 39 and 40 so as to perform incremental or decremental counting.

As shown in FIG. 6(a), for example, 1,000 light transmission and shielding portions are provided on the circumference of the rotating plate 6. When the rotating plate 6 is rotated at a maximum speed of 1,200 RPM, a rotational output signal frequency f thereof is 20 kHz, and a period per pitch is $\tau = 50$ $\mu$sec (see FIG. 6(a)). In contrast to this, a pulse $CLK_0$ the oscillator 31 has a pulse period of $p > t$, as shown in FIG. 6(b), and in this embodiment, $t = 12.5$ $\mu$sec. In addition, an ON time $t_1$ is set sufficient to operate the light emitting diodes 33a and 33b, the photodiodes 34 and 36, the amplifier circuits 35 and 36 and the like, e.g., $t_1 = 2.5$ $\mu$sec. The monostable multivibrator 32 receives the pulse $CLK_0$, and generates a strobe pulse serving as a clock pulse of the circuit elements 421 to 424, 425 and 41 in response to a trailing edge thereof, as shown in FIG. 6(c).

When the pulse $CLK_0$ is set as described above, power can be easily supplied to the light emitting diodes and the like during the ON time $t_1$ as compared to a conventional case wherein power is continuously supplied, thus considerably reducing power consumption. When power consumption is reduced, a cell, e.g., a lithium cell, can be used as the power source 20 independently of a control power source for a long period of time, and data from the signal processing circuit will not be influenced by the control power source.

The operation of the circuit shown in FIG. 5 will be described.

When the pulse $CLK_0$ is applied to the light emitting diodes 33a and 33b, the A- and B-phase signals SA and SB are obtained in response to the pulse $CLK_0$ and rotation of the rotating plate 6 (FIGS. 6(d), (e)). In the case of normal rotation, the B-phase signal is delayed by 90° from the A-phase signal SA. The A-phase signal SA is supplied to the flip-flop 421, and the flip-flop 421 is set in response to the clock pulse $CLK_1$ and the output SA1 goes to HIGH level. In response to the next clock pulse, the flip-flop 422 is set by the output SA1, and the output SA2 goes to HIGH level to be delayed from the output SA1 by 1 cycle ($CLK_1$) (FIGS. 6(f), (g)). As for the B-phase signal SB, the outputs SB1 and SB2 are similarly obtained (FIGS. 6(h), (i)). When these signals are at HIGH level, they are weighted as SA1=1, SA2=2, SB1=4 and SB2=8 and are supplied to terminals A0, A1, A2 and A3 of the decoder (DECDR) 425 so as to be generated as an up/down signal $S_{UD}$ of 16 lines (FIG. 6(j)).

Figure 7:
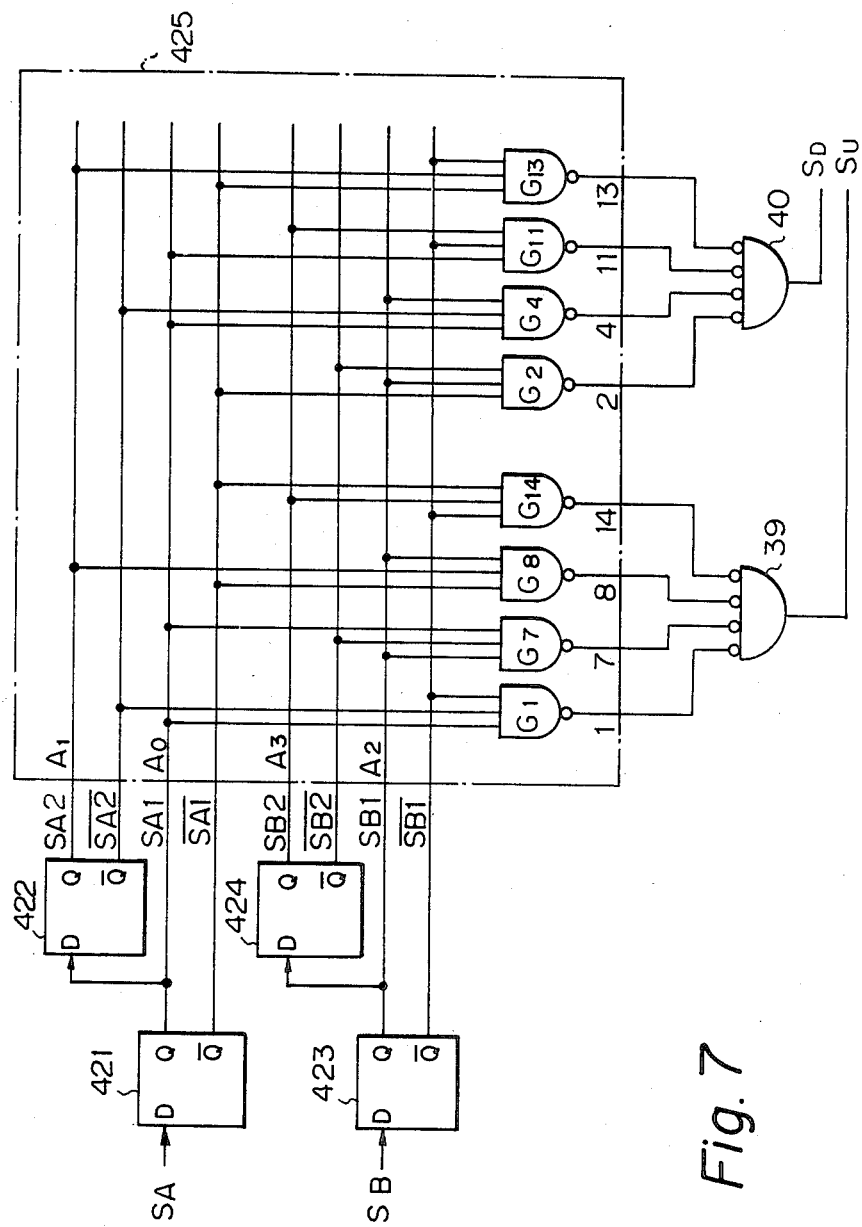
FIG. 7 is a circuit diagram of a decoder shown in FIG. 5.

The decoder (DECDR) 425 is constituted by gates G1 to G14, as shown in FIG. 7. In this embodiment, since the rotating plate is rotated in the normal direction, and the A-phase signal SA is advanced from the B-phase signal SB by 90°, the up/down signals $S_{UD}$ become up pulse signals $S_U$. As shown in FIG. 7, when a sum of signals: SA1+SA2+SB1+SB2 yields 1, 7, 8 and 14, the up pulse signals $S_U$ are generated from the gates G1, G7, G8 and G14. If the B-phase signal SB is advanced from the A-phase signal SA, i.e., when the encoder is rotated in the reverse direction, and a sum of signals: SA1+SA2+SB1+SB2 yields 2, 4, 11 and 13, down pulse signals $S_D$ are generated from the gates G2, G4, G11 and G13. When the encoder is rotated both in the normal and reverse directions, the up and down pulse signals $S_U$ and $S_D$ are generated.

Referring to FIG. 7, it should be noted that since the outputs from the decoder 425 are negative logic data, they are inverted at input ports of the OR gates 39 and 40 unlike in FIG. 5.

When the rotating plate 6 is rotated in the normal direction, the up/down signals $S_{UD}$ are supplied to an incremental count terminal UP of the up/down counter 41 through the OR gate 39, and otherwise, are supplied to a decremental count terminal DWN through the OR gate 40. In this manner, the up/down counter 41 can generate a signal indicating a rotational position of the rotating plate 6. As described above, the output from the up/down counter 41 can be considered as an output virtually in the absolute mode since the power source 20 is arranged so as not to be turned off.

In addition to the above-mentioned counting, the up/down counter generates a signal indicating a rotational speed corresponding to the normal or reverse rotation every time the count reaches a value corresponding to the number of the light transmission areas of the rotating plate. Thus, the rotational speed can be obtained together with the rotating direction, and the encoder device can provide a total positional signal of an industrial machine.

Figure 6:
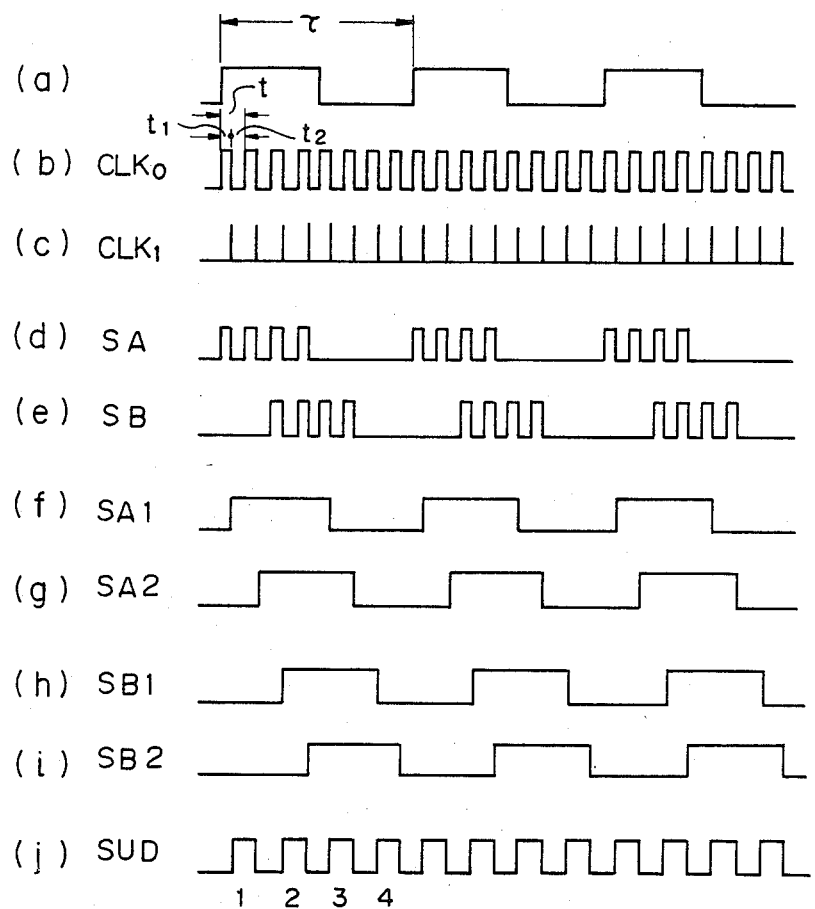
FIG. 6 is a timing chart showing the circuit shown in FIG. 5.
Figure 8:
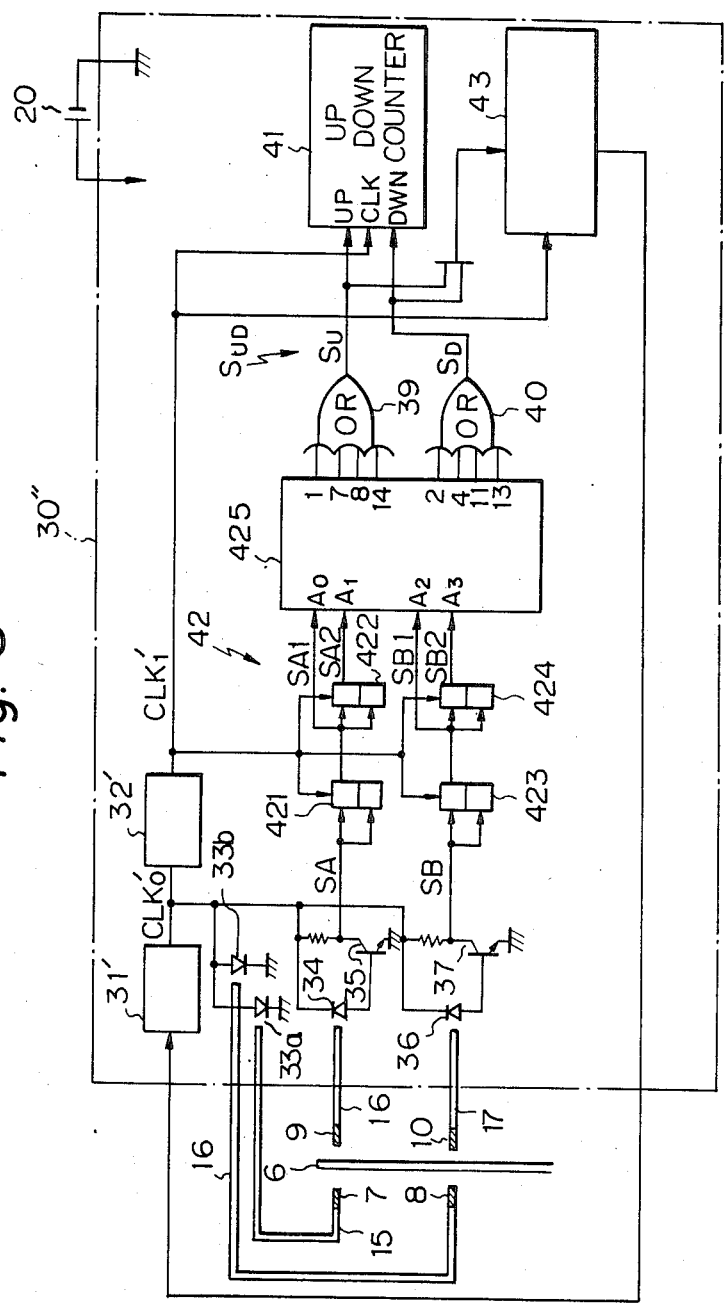
FIG. 8 is a view showing a modification of the circuit shown in FIG. 5.
Figure 9:
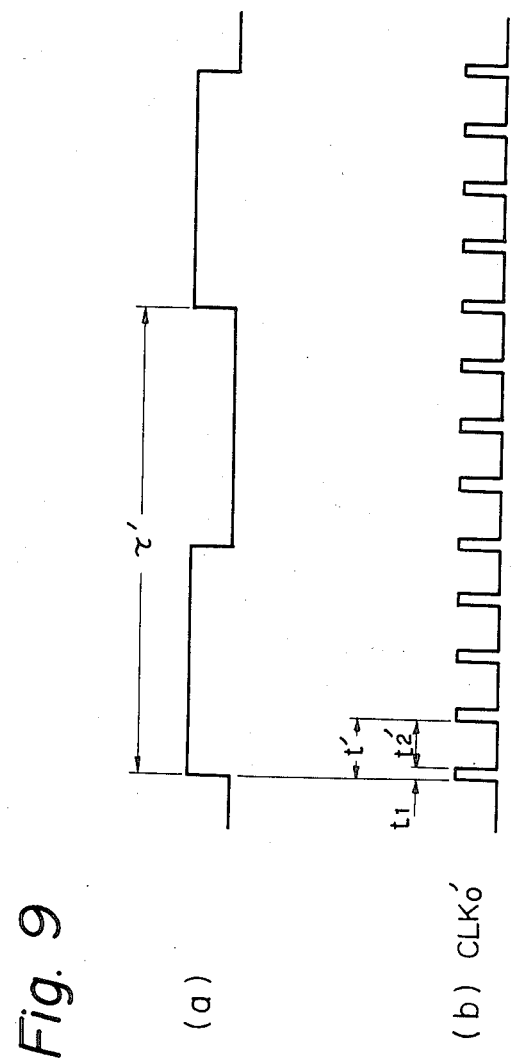
FIG. 9 is a timing chart of the circuit shown in FIG. 8.

A case has been described wherein the rotating plate 6 is rotated at a maximum speed of 1,200 RPM. When the rotating plate 6 is rotated at a speed half of the maximum speed, i.e., 600 RPM, the period $\tau$ of FIG. 6 is set to be 100 $\mu$sec. Therefore, when the pulse having the pulse period described above is generated, the A- and B-phase signals SA and SB respectively obtain 8 pulses per cycle. However, in order to obtain the above-mentioned rotation signal, only four pulses are required. For this reason, as shown in FIG. 8, the pulse period of the oscillator is changed in accordance with the rotational speed of the rotating plate. That is, since the up/down signal from the decoder 425 indicates a rotational speed of the rotating plate, this signal is supplied to a pulse frequency changing circuit 43. In response to this signal, the circuit 43 calculates that the rotational speed is 600 RPM, and supplies to the oscillator 31' a control signal for doubling the period t every time the light transmission portion is rotated by one pitch. On the other hand, the oscillator 31' can change its frequency in response to the control signal. As shown in FIG. 9(a), even when the period $\tau'$ is doubled, four clock pulses $CLK'_0$ are generated in one cycle, and the signals SA and SB obtained thereby also have four pulses.

In this manner, generation frequency of the pulse $CLK'_0$ is decreased, and power consumed by a signal processing circuit 30'' shown in FIG. 8 can be reduced. Note that although the pulse period t' is changed, the ON time $t_1$ can remain the same.

From the viewpoint of power consumption, the signal processing circuits shown in FIGS. 3, 5, 7 and 8 can be constituted by a CMOS device.

Figure 10:
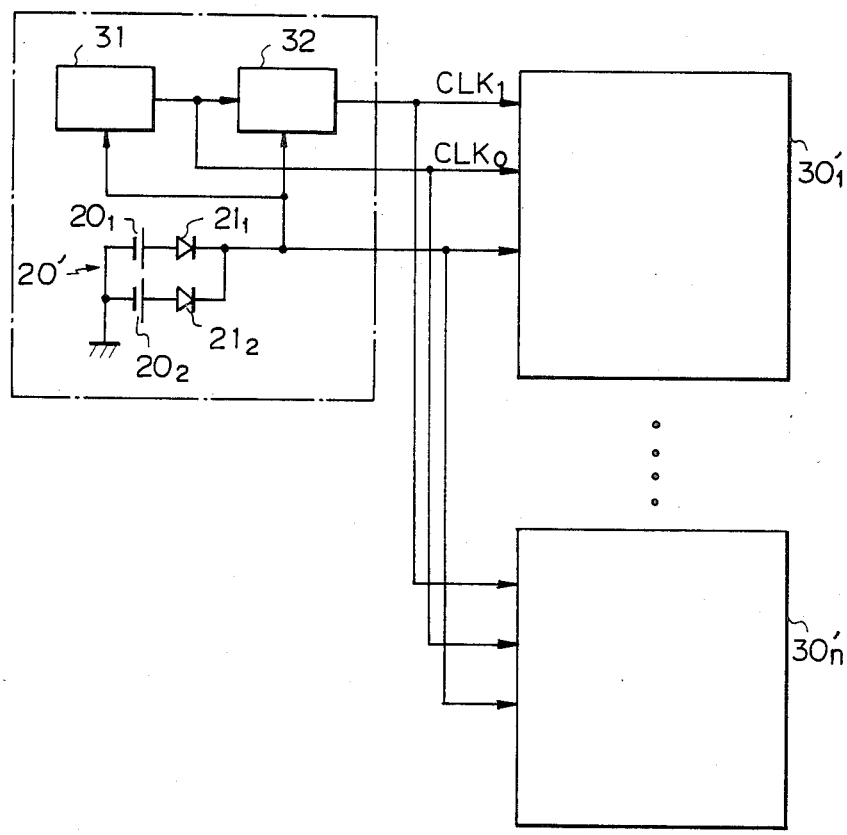
FIG. 10 is a circuit diagram when a plurality of signal processing circuits are used.

As for the circuit shown in FIG. 5, a case has been described wherein a single encoder is provided. However, when a plurality of encoders are used and a pulse period is not changed in accordance with a rotational speed of the rotating plate, as shown in FIG. 10, the oscillator 31, the monostable multivibrator 32 and a power source 20' are commonly used, and a plurality of signal processing circuits 30'$_1$ to 30'$_n$ excluding the above components are provided, resulting in low cost. When a cell is used as the power source 20' and a double system is employed, internal replacement and high reliability can be obtained.

As described above, according to the present invention, a highly reliable encoder device which cannot be easily influenced by environmental factors such as temperature and by electrical noise can be obtained. The encoder device of the present invention allows easy assembly and adjustment. Furthermore, the encoder device can obtain a rotational position, a rotating direction and a rotational speed of the rotating plate in the absolute mode with low power consumption and easy maintenance.

Note that improvements in resistance to noise and an environmental resistance by using optical fiber cables are not limited to the incremental type encoder device but can be applied to an encoder device having an absolute type mechanism section.

The present invention is not limited to the above particular embodiments, and various changes and modifications may be made by a person skilled in the art within the spirit and scope of the invention.

INDUSTRIAL APPLICABILITY

An encoder device according to the present invention can be applied for precisely detecting positions of various moving machines.

I claim:
1. An encoder device comprising:
   a mechanism section including a rotating plate (6) fixed to a rotating shaft (2) to be rotated therewith, said rotating plate being provided with a plurality of light transmission areas (61) and light shielding ares (62) at given intervals along as circumference thereof;
   a signal processing circuit (30, 30', 30'') for generating at least a signal representing the rotational position of said rotating plate (6) in response to passage of light through said light transmission areas, said signal processing circuit including a pair of light emitting diodes (33a, 33b) for generating light pulses and a pair of photoelectric converting elements (34, 36) for detecting said light pulses; and
   optical fiber cable means connecting said signal processing circuit and said mechanism section which are separated from each other, said optical fiber cable means including first optical cable means for conducting light from said light emitting diodes to said mechanism section and second optical fiber cable means for conducting light passing through said rotating plate from said mechanism section to said photoelectric converting elements of said signal processing circuit;
   wherein said mechanism section comprises a fixed flange (3) having a hole therein through which said rotating shaft (2) passes and a cylindrical boss formed thereon facing said rotating plate (6) concentric with said rotating shaft (2), a stationary slit table (4) having a cylindrical central cylindrical opening fitting to said flange cylindrical boss and formed with an outer cylindrical engagement portion, and an annular optical fiber fixing table (5) fitted on said engagement portion of said stationary slit table;
   said optical fiber fixing table (5) being formed with through holes (11, 12) receiving distal end portions (7, 8) of said first optical fiber cable means and said stationary slit table (4) being formed with through holes (13, 14) for receiving distal end portions (9, 10) of said second optical fiber cable means, said through holes (13, 14) of said stationary slit table (4) being opposed to said through holes (11, 12) of said optical fiber fixing table (5); and
   a stationary slit (4a) provided on said stationary slit table (4) positionable with respect to said stationary slit table so as to be aligned with said light transmission areas (61) of said rotating plate (6) to permit light from said first optical fiber cable means pass- ing through said light transmission areas (61) to reach said second optical fiber cable means;

said optical fiber fixing table (5) through holes (11,12) being adjustably positioned with respect to said stationary slit table (4) through holes (13, 14) by rotation of said optical fiber fixing table (5) with respect to said stationary slit table (4) on said cylindrical engagement portion.

2. An encoder device comprising:

a mechanism section including a rotating plate (6) fixed to a rotating shaft (2) to be rotated therewith, said rotating plate being provided with a plurality of light transmission area (61) and light shielding areas (62) at given intervals along a circumference thereof;

a signal processing circuit (30, 30', 30") for generating at least a signal representing the rotational position of said rotating plate (6) in response to passage of light through said light transmission areas, said signal processing circuit including a pair of light emitting diodes (33a, 33b) for generating light pulses and a pair of photoelectric converting elements (34, 36) for detecting said light pulses; and optical fiber cable means connecting said signal processing circuit and said mechanism section which are separated from each other, said optical fiber cable means including first optical cable means for conducting light from said light emitting diodes to said mechanism section and second optical fiber cable means for conducting light passing through said rotating plate from said mechanism section to said photoelectric converting elements of said signal processing circuit;

wherein said signal processing circuit comprises oscillator means for applying light controlling pulses to said light emitting diodes (33a, 33b) having an ON time $t_1$ at a repetition period t greater than $t_1$, $t_1$ being a time period substantially shorter than a time period during which continuous light would be transmitted through said rotating plate per pitch of said light transmission areas at maximum rotational speed of said rotating plate (6);

a counter circuit (42, 39, 40, 41) including said photoelectric converting elements (34, 36) for converting a light reception signal from said light emitting diodes received through said second optical fiber cable means so as to obtain a conversion signal, and for detecting rotational position and at least one of leading and trailing edges of the conversion signal in response to the conversion signal and to provide signals from which to calculate a rotating direction and a rotational speed of said rotating plate; and wherein said repetition period t of said light controlling pulses of said oscillator means is changed in response to rotational speed of said rotating plate.

3. An encoder device according to claim 2, wherein an ON time of the pulse genrted from said oscllator means is a minimum predetermined time period defined by an operation time of said light emitting element (33a, 33b), said photoelectric converting element (34, 36), said counter circuit and the like.

4. An encoder device according to claim 3, wherein said counter circuit includes a circuit (42) for detecting at least one of leading and trailing edges of the signal from said second optical fiber means, and counter (41) having an up/down counting function for calculating the rotating direction and the rotational speed of said rotating plate in response to a signal from said detecting circuit.

5. An encoder device according to claim 2, wherein said signal processing circuit (30, 30', 30") has a plurality of counter circuits, one oscillator circuit and one power source so that said plurality of counter circuits are operated by the common oscillator circuit and power source.

6. An encoder device according to claim 2, wherein said signal processing circuit (30, 30', 30") comprises a CMOS device.

* * * * *